(12) United States Patent
Kimura et al.

(10) Patent No.: US 11,336,184 B2
(45) Date of Patent: May 17, 2022

(54) POWER CONVERTER

(71) Applicant: Panasonic Intellectual Property Management Co., Ltd., Osaka (JP)

(72) Inventors: Shinya Kimura, Tokyo (JP); Toshihiko Bessho, Kanagawa (JP); Satoshi Kominami, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/017,152

(22) Filed: Sep. 10, 2020

(65) Prior Publication Data
US 2020/0412252 A1    Dec. 31, 2020

Related U.S. Application Data

(63) Continuation of application No. PCT/JP2019/012575, filed on Mar. 25, 2019.

(30) Foreign Application Priority Data

Mar. 28, 2018    (JP) .............................. JP2018-061917

(51) Int. Cl.
*H02M 3/335*    (2006.01)
*B60L 53/20*    (2019.01)
*H02M 7/00*    (2006.01)

(52) U.S. Cl.
CPC ......... *H02M 3/33507* (2013.01); *B60L 53/20* (2019.02); *H02M 7/003* (2013.01)

(58) Field of Classification Search
None
See application file for complete search history.

(56) References Cited

U.S. PATENT DOCUMENTS

| 6,518,887  B2 * | 2/2003  | Suzuki ............... G06K 19/0776 340/572.8 |
| 9,847,727  B1 * | 12/2017 | Chen ................. H02M 3/33507 |
| 10,348,212 B2 * | 7/2019  | Kikuchi ............... H02M 3/335 |
| 10,411,608 B2 * | 9/2019  | Ye ...................... H02M 3/33569 |

(Continued)

FOREIGN PATENT DOCUMENTS

| JP | 2002-272106 A | 9/2002 |
| JP | 2009-224933 A | 10/2009 |

(Continued)

OTHER PUBLICATIONS

English Translation of Japanese Notice of Reasons for Refusal dated Jul. 13, 2021, for the corresponding Japanese Patent Application No. 2018-061917, 6 pages.

(Continued)

*Primary Examiner* — Jeffrey A Gblende
(74) *Attorney, Agent, or Firm* — Seed IP Law Group LLP

(57) ABSTRACT

An LLC resonant converter in which a capacitor (Cr), an inductance (Lr), and a power line between the capacitor (Cr) and the inductance (Lr), which constitute a series resonance unit, are resin-encapsulated by a resin. Because the series resonance unit that is a high voltage portion is resin-encapsulated collectively, it is possible to shorten an insulation distance even in the case of higher voltages and frequencies, and to prevent an increase in size.

8 Claims, 5 Drawing Sheets

(56) References Cited

U.S. PATENT DOCUMENTS

2018/0241306 A1    8/2018  Takahashi et al.
2020/0228094 A1*   7/2020  Kato .................. H04B 1/18

FOREIGN PATENT DOCUMENTS

| JP | 2010-233294 A | 10/2010 |
| JP | 2014-39384 A | 2/2014 |
| JP | 2017-77078 A | 4/2017 |
| KR | 200191747 Y1 * | 8/2000 |
| WO | 2014/027536 A1 | 2/2014 |
| WO | 2017/022477 A1 | 2/2017 |

OTHER PUBLICATIONS

International Search Report, dated Apr. 23, 2019, for International Application No. PCT/JP2019/012575, 3 pages.

* cited by examiner

POWER CONVERTER

TECHNICAL FIELD

The present invention relates to an LLC resonant converter used in, for example, an on-board charger.

BACKGROUND ART

Conventionally, as a charger mounted on an electric vehicle (EV) or a plug-in hybrid vehicle (PHV) or the like, a configuration is known comprising an LLC resonant converter for converting power. A typical LLC resonant converter includes a transformer having a primary winding and a secondary winding, a resonant capacitor connected to the primary side of the transformer, a switching circuit for controlling the energization of the transformer and the resonant capacitor, a rectifying circuit connected to the secondary side of the transformer, and the like.

An LLC resonant converter proactively generates a leakage inductance due to a reduced coupling coefficient of the transformer, and utilizes this as a resonant inductance. That is, an LLC resonant converter has a resonant circuit constituted with a leakage inductance and a resonant capacitor of a transformer.

The LLC resonant converter is disclosed in, for example, Patent Literatures (hereinafter, referred to as "PTLs") 1 and 2.

CITATION LIST

Patent Literatures

PTL 1
Japanese Patent Application Laid-Open No. 2017-77078
PTL 2
WO2017/22477

SUMMARY OF INVENTION

Technical Problem

When an LLC resonant converter is formed to include a series resonator constituted with a capacitor and an impedance, a high voltage is generated at the series resonator (LC series resonator).

On the other hand, in order to compactify an LLC resonant converter, it is desired to increase the resonant frequency (driving frequency).

Therefore, the series resonator (LC series resonator) is expected to be exposed to a high voltage and a high frequency.

Here, according to the insulation distance (creepage distance) defined in IEC60664-4 (JIS C 60664-4), the higher the voltage becomes and the higher the frequency becomes, the longer the required insulation distance becomes. As a result, designing an LLC resonant converter for a higher voltage and a higher frequency leads to increase in size of the LLC resonant converter.

The present invention has been made in consideration of the points described above; even when designed for a higher voltage and a higher frequency, an LLC resonant converter is provided with suppressing increase in size.

Solution to Problem

One aspect of the LLC resonant converter of the present invention is an LLC resonant converter including at least a series resonator constituted with a capacitor and an inductance, and the capacitor, the inductance, and a power line between the capacitor and the inductance, are resin-sealed.

Advantageous Effects of Invention

According to the present invention, even when designed for a higher voltage and a higher frequency, an LLC resonant converter can be provided with suppressing increase in size.

DESCRIPTION OF EMBODIMENTS

Embodiments of the present invention will be described below with reference to the drawings.

Embodiment

Figure 1:
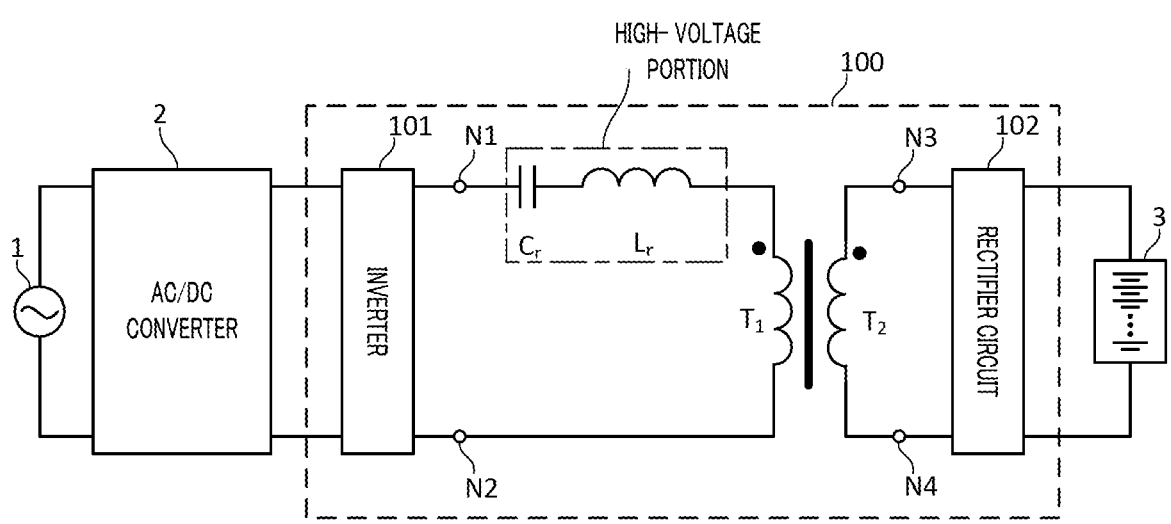
FIG. 1 is a circuit diagram including an LLC resonant converter according to an embodiment.

FIG. 1 is a circuit diagram including LLC resonant converter 100 according to an embodiment of the present invention. The example shown in FIG. 1 is an example using LLC resonant converter 100 of the present embodiment in an on-board charger.

In FIG. 1, LLC resonant converter 100 is connected to external power supply 1 via AC/DC converter 2. External power supply 1 is a commercial power supply for supplying single-phase AC power of, for example, 60 Hz and 200V, and supplies an AC power to the input stage of AC/DC converter 2.

AC/DC converter 2 converts an AC power inputted from external power supply 1 into a DC power, and supplies this to LLC resonant converter 100. AC/DC converter 2 includes, for example, a rectifying circuit and a smoothing capacitor. Also, AC/DC converter 2 may be further provided with power factor improving circuitry or the like at the output stage. AC/DC converter 2 converts, for example, a 200V single-phase AC power inputted from external power source 1 into a 400V DC power.

LLC resonant converter 100 supplies a DC power obtained by AC/DC converter 2 to battery 3 while insulating external power supply 1 from battery 3.

LLC resonant converter 100 has inverter 101. Inverter 101 forms a transmission power having a predetermined driving frequency from a DC power inputted from AC/DC converter 2, and outputs the transmission power to first and second nodes N1 and N2.

Furthermore, LLC resonant converter 100 includes transformers (or power transmission coils) $T_1$ and $T_2$, capacitor (or capacity element) Cr, and inductance (or inductance element) Lr. Primary winding $T_1$ of the transformer is electrically connected between first node N1 and second node N2. Further, between first node N1 and first wire $T_1$, capacitor Cr and inductance Lr are connected in serial. Thus, a series resonator is constituted with capacitor Cr and inductance Lr.

Rectifier circuit 102 is connected to third and fourth nodes N3 and N4 provided at both ends of secondary winding $T_2$ of a transformer, and battery 3 to be charged is connected via rectifier circuit 102.

With this configuration, LLC resonant converter 100 can supply a DC power obtained by AC/DC converter 2 to battery 3 while insulating external power supply 1 from battery 3. Here, when LLC resonant converter 100 inputs a DC power of 400V from AC/DC converter 2, the series resonator of LLC resonant converter 100 operates at a driving frequency of 0.35 MHz and a peak voltage of 2000V, for example.

Inverter 101 and rectifier circuit 102 can have a known configuration, and thus a description thereof is provided herein briefly. Inverter 101 is configured with a plurality of switching elements, and a driving power having a frequency corresponding to the switching of the switching element is outputted as a power transmitted to LLC resonant converter 100. Rectifier circuit 102 is configured of a plurality of rectifying elements and smoothing capacitors.

Figure 2:
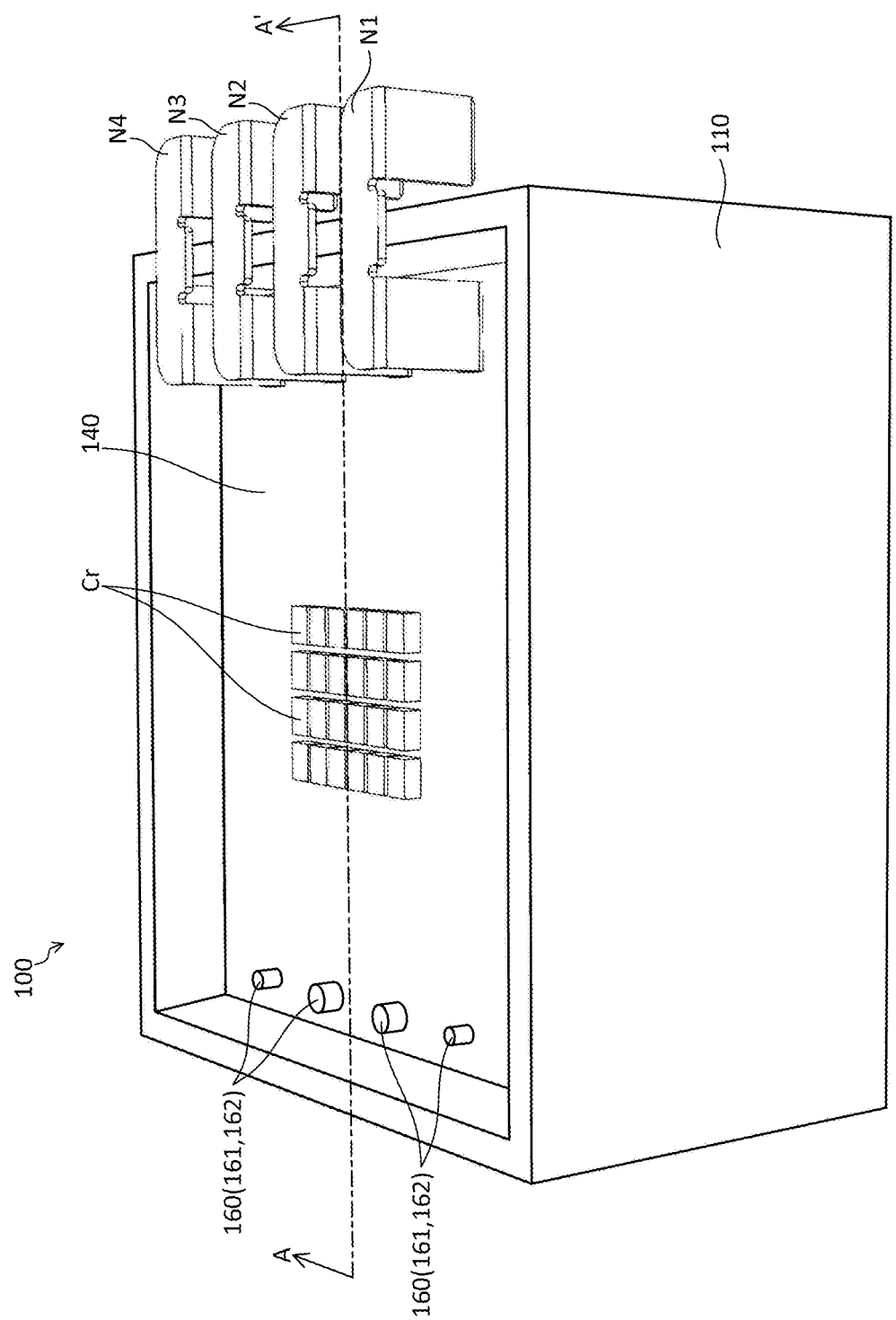
FIG. 2 is a perspective view of a packaged LLC resonant converter from a diagonally upward direction.
Figure 3:
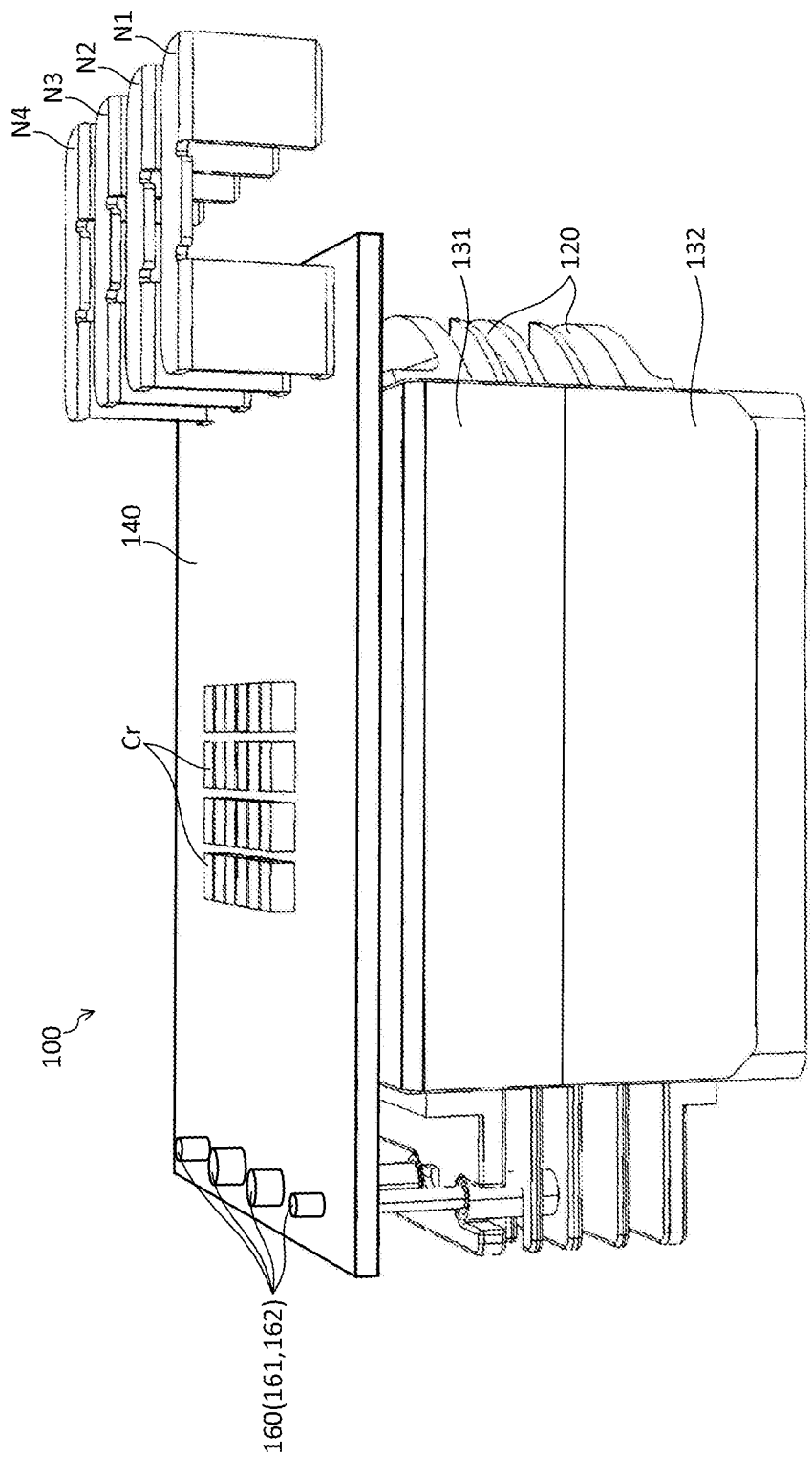
FIG. 3 is a perspective view when a case is removed in FIG. 2.
Figure 4:
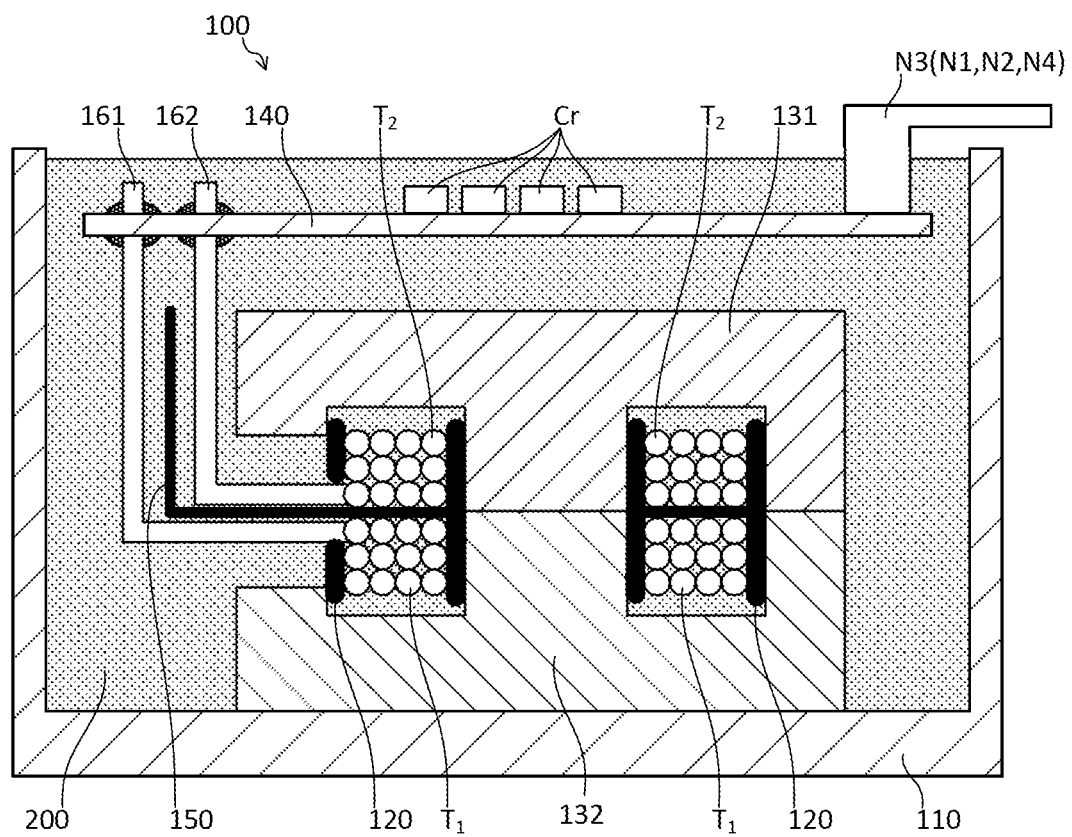
FIG. 4 is an A-A' cross-sectional view of FIG. 2.

FIGS. 2 to 4 are a diagram showing a package configuration of LLC resonant converter 100 according to the present embodiment. FIG. 2 is a perspective view of packaged LLC resonant converter 100 from a diagonally upward direction. FIG. 3 is a perspective view in which case 110 is removed from FIG. 2 FIG. 4 is a cross-sectional view showing an A-A' cross-section of FIG. 2.

LLC resonant converter 100 is formed with primary winding $T_1$, secondary winding $T_2$, bobbin 120, upper core 131, lower core 132, printed circuit board 140, partition plate 150, and the like, which are accommodated in case 110.

Case 110 is made of a metal. Case 110 may be made of, for example, a resin, however heat dissipation is improved by being made of a metal, resulting in being advantageous in terms of compactification.

Bobbin 120 is made of, for example, a synthetic resin material having insulating properties. Bobbin 120 has a winding portion (reference sign omitted) for winding primary winding $T_1$ and secondary winding $T_2$. As can be seen in FIG. 4, bobbin 120 has, for example, a first winding portion (reference sign omitted) at a lower side around which primary winding $T_1$ is wound, and a second winding portion (not shown) at an upper side around which secondary winding $T_2$ is wound. The first winding portion and the second winding portion are separated by partition plate 150. Primary winding $T_1$ and secondary winding $T_2$ are wound around the winding portion of bobbin 120 while being insulated by partition plate 150. In an example of FIG. 4, partition plate 150 extends from the inside to the outside of bobbin 120 so as to be interposed between lead wires 161 and 162 drawn out from primary winding $T_1$ and secondary winding $T_2$, thereby providing insulation between lead wires 161 and 162, as well.

Upper core 131 and lower core 132 are, for example, an EE core made of a magnetic material such as ferrite. Upper core 131 and lower core 132 are coupled to the bobbin 120 around which primary winding $T_1$ and secondary winding $T_2$ are wound, and form a magnetic path when primary winding $T_1$ and secondary winding $T_2$ are energized.

Lead wire 161 drawn out from primary winding $T_1$ and lead wire 162 drawn out from secondary winding $T_2$ are electrically connected to printed circuit board 140 disposed over an upper side of the transformer portion to be stacked on transformer portion. Here, in practice, there are two lead wires 161 of primary winding $T_1$ and two lead wires 162 of secondary winding $T_2$, respectively, so that a total of four lead wires 160 (FIG. 3) are electrically connected to wiring patterns of printed circuit board 140.

Lead wires 160 are connected by the wiring of printed circuit board 140 as follows. One of two lead wires 161 of primary winding $T_1$ is connected to first node N1 via a capacitor Cr, and the other is connected to second node N2. One of two lead wires 162 of secondary winding $T_2$ is connected to third node N3, and the other is connected to fourth node N4.

Here, in the present embodiment, capacitor Cr comprises a plurality of capacitors provided in cascaded connection. As a capacitor, for example, a ceramic capacitor is used.

In addition to the above-described configuration, in LLC resonant converter 100 of the present embodiment, case 110 is filled with thermal curing resin 200, as shown in FIG. 4. Resin 200 is poured into case 110 after the above-described components are disposed in case 110.

Thus, capacitor Cr and inductance Lr (in this embodiment, primary winding $T_1$ functions as inductance Lr) which constitutes a serial resonator, and a power line between capacitor Cr and inductance Lr (lead wire 160), are resin-sealed.

Here, in the present embodiment, primary winding (transformer) $T_1$ has a function which corresponds to that of inductance Lr. That is, primary winding (transformer) $T_1$ and inductance Lr are integrally formed. This enables compactification compared to when inductance Lr and a transformer are formed separately. Of course, inductance Lr may be formed separately from primary winding (transformer) $T_1$. When inductance Lr and primary winding (transformer) $T_1$ are separately formed, primary winding (transformer) $T_1$ is excluded from a high-voltage portion, and thus primary winding (transformer) $T_1$ may not be resin-sealed. However, in consideration of easiness of the resin-sealing process, the transformer may also be resin-sealed.

As resin 200 for sealing, a resin having a high insulating property is used. Further, as resin 200, a resin having high-voltage resistance is preferably used. Further, a resin having high thermal conductivity is preferably used. Further, in order to prevent breakage of upper core 131, lower core 132, and capacitor Cr during thermal curing, it is preferable to use a resin having a low shrinkage during thermal curing. As resin 200, for example, a resin made of silicone, epoxy, urethane, or the like is used.

Here, when LLC resonant converter 100 is operated, a particularly high voltage is generated at the series resonator shown in FIG. 1. Therefore, it is necessary to increase the insulation distances. For example, in lead wires 161 of primary winding $T_1$, the voltage becomes high at lead wire 161 that is connected to capacitor Cr, and thus it is necessary to increase the insulation distances, for example, between that lead wire 161 and case 110, between that lead wire 161 and other lead wires, and between that lead wire 161 and cores 131, 132. Further, since a high voltage is generated at capacitor Cr, it is necessary to increase the insulation distance between capacitor Cr and an upper cover (not shown) of case 110 disposed over capacitor Cr. Also, it is necessary to increase the insulation distance between primary winding $T_1$ and core 131. Higher driving frequency of LLC resonant converter 100 requires further increase in these isolation distances.

In the present embodiment, since capacitor Cr, inductance Lr (primary winding $T_1$ in the present embodiment), and the power line between capacitor Cr and inductance Lr (lead wire 160) where a high voltage is generated, are resin-sealed, even when operated at a high voltage and a high frequency, the required insulation distances can be shortened. More specifically, the insulation distances can be shortened between lead wire 161 and case 110, between high-voltage lead wire 161 and other lead wires, between high-voltage lead wire 161 and cores 131, 132, and between capacitor Cr and an upper cover of case 110 where a high voltage is generated. As a result, increase in size of an LLC resonant converter can be suppressed even when designed for a higher voltage and a higher frequency.

As described above, according to the present embodiment, by resin-sealing capacitor Cr, inductance Lr (primary winding $T_1$, also functioning as inductance Lr in the present embodiment), and a power line (lead wire 160) between capacitor Cr and inductance Lr that constitute a series resonator, increase in size of an LLC resonant converter can be suppressed even when designed for a higher voltage and a higher frequency.

The above-described embodiments are merely illustrative embodiments for implementing the present invention, and the technical scope of the present invention should not be construed as being limited by these embodiments. That is, the present invention can be embodied in various forms without departing from the gist or essential features thereof.

In the embodiments described above, all capacitors that constitute capacitor Cr are resin-sealed. However, only some of capacitors where a high voltage is generated may be resin-sealed, and the other capacitors may not be resin-sealed. Similarly, in the embodiment described above, an example where all lead wires (power lines) 160 are resin-sealed has been described, but only some of lead wires (power lines) 160 where a high voltage is generated may be resin-sealed, and other lead wires (power lines) 160 may not be resin-sealed.

Figure 5:
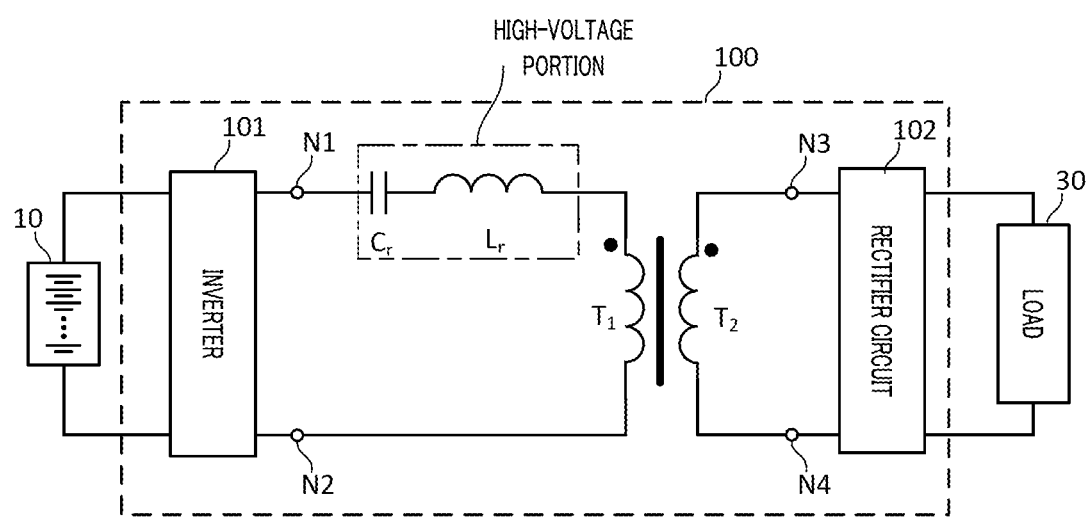
FIG. 5 is a circuit diagram illustrating a configuration using an LLC resonant converter as a step-up DC-DC converter.

In the above-described embodiment, an example of using an LLC resonant converter of the present invention in an on-board charger has been illustratively described, an LLC resonant converter of the present invention can be used in devices other than an on-board charger. For example, as shown in FIG. 5, an LCC resonant converter of the present invention can be provided between battery 10 and load 30 and used as a step-up DC-DC converter for boosting the voltage of battery 10 to be supplied to load 30. Specifically, LLC resonant converter 100 of FIG. 5 inputs and boosts the power of battery 10 to output. For example, a voltage of battery 10 of about 200V is boosted to a voltage of about 500V by LLC resonant converter 100. A power boosted by LLC resonant converter 100 is supplied to load 30, such as a motor. Similarly, the inventive LLC resonant converter can also be used as a step-down DC-DC converter.

The disclosures of the specification, drawings and abstract contained in the Japanese Patent Application No. 2018-061917, filed on Mar. 28, 2018, are hereby incorporated by reference in their entirety.

INDUSTRIAL APPLICABILITY

An LLC resonant converter of the present invention has the effect of suppressing increase in size even when designed for a higher voltage and a higher frequency, and applicable to various DC-DC converters.

REFERENCE SIGNS LIST

1 External power supply
2 AC/DC converter
3, 10 Battery
30 Load
100 LLC resonant converter
101 Inverter
102 Rectifier circuit
110 Case
120 Bobbin
131 Upper core
132 Lower core
140 Printed circuit board
150 Partition plate
160, 161, 162 Lead wires (power lines)
200 Resin
Cr Capacitor
Lr Inductance
N1-N4 Nodes

The invention claimed is:

1. An LLC resonant converter comprising at least a series resonator having a capacitor and an inductance; and
a power transmission coil electrically connected between a first node and a second node of an inverter that outputs a transmission power having a predetermined driving frequency between the first node and the second node,
wherein the capacitor, the inductance, and a power line between the capacitor and the inductance are resin-sealed,
wherein the capacitor and the inductance constituting the series resonator are connected in series between the first node and the power transmission coil,
wherein the power transmission coil and the inductance are integrally formed, and the power transmission coil and the inductance that are integrally formed are resin-sealed, and
wherein the power transmission coil and the inductance that are integrally formed are accommodated in a case having an opening on an upper side, and the case is filled with a resin with the capacitor being stacked on the power transmission coil and the inductance that are integrally formed, to integrally resin-seal the series resonator and the power transmission coil.

2. The LLC resonant converter according to claim 1, comprising a case accommodating the series resonator and the power transmission coil, wherein the case is filled with a resin to integrally resin-seal the series resonator and the power transmission coil.

3. The LLC resonant converter according to claim 1, wherein the case is made of a metal.

4. The LLC resonant converter according to claim 1, wherein the case is made of a resin.

5. The LLC resonant converter according to claim 1, wherein the capacitor is a ceramic capacitor.

6. The LLC resonant converter according to claim 1, wherein the resin that seals the capacitor, the inductance and the power line is made of silicone.

7. The LLC resonant converter according to claim 1, wherein the resin that seals the capacitor, the inductance and the power line is made of epoxy.

8. The LLC resonant converter according to claim 1, wherein the resin that seals the capacitor, the inductance and the power line is made of urethane.

* * * * *